Aug. 14, 1934. J. L. THORNLEY 1,970,064
REMOTE VOLUME CONTROL FOR TALKING AND/OR SOUND PICTURE EQUIPMENT
Filed Nov. 25, 1930 3 Sheets-Sheet 1
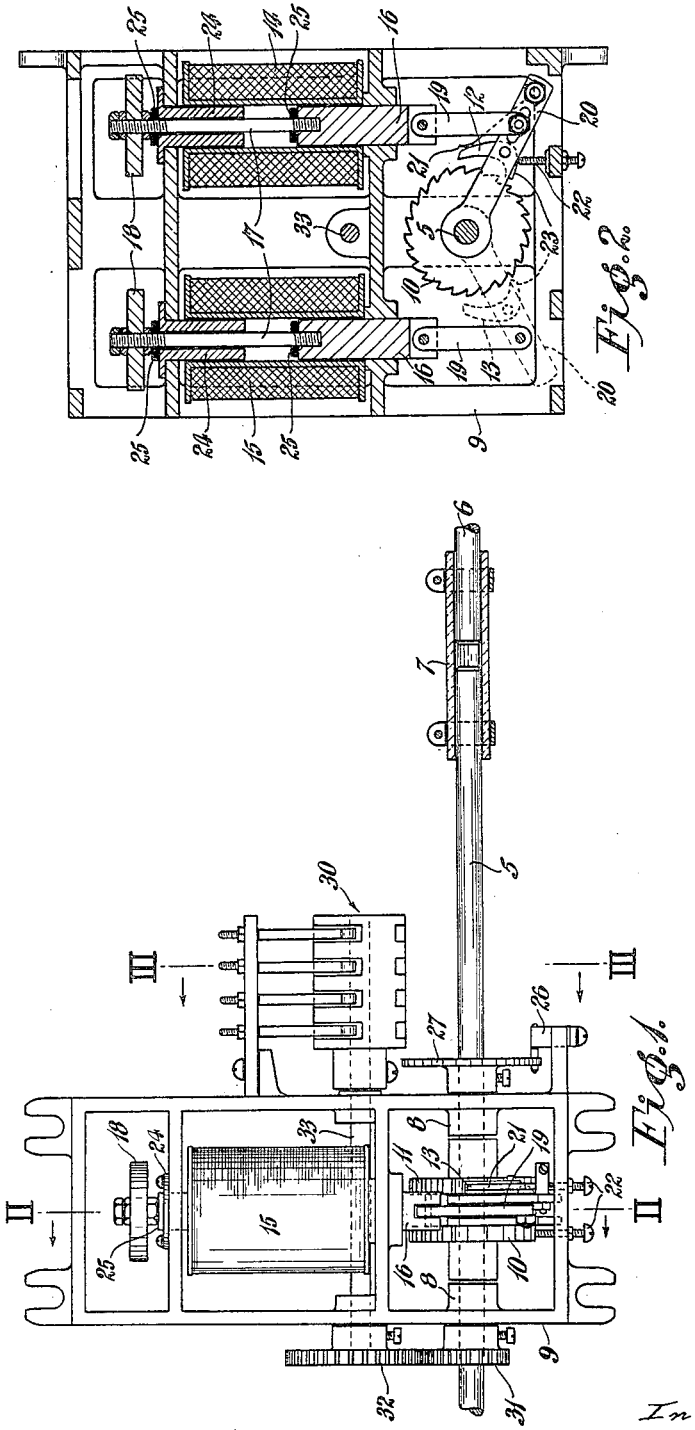
Inventor:
James Leiver Thornley
By [signature] Attorney.

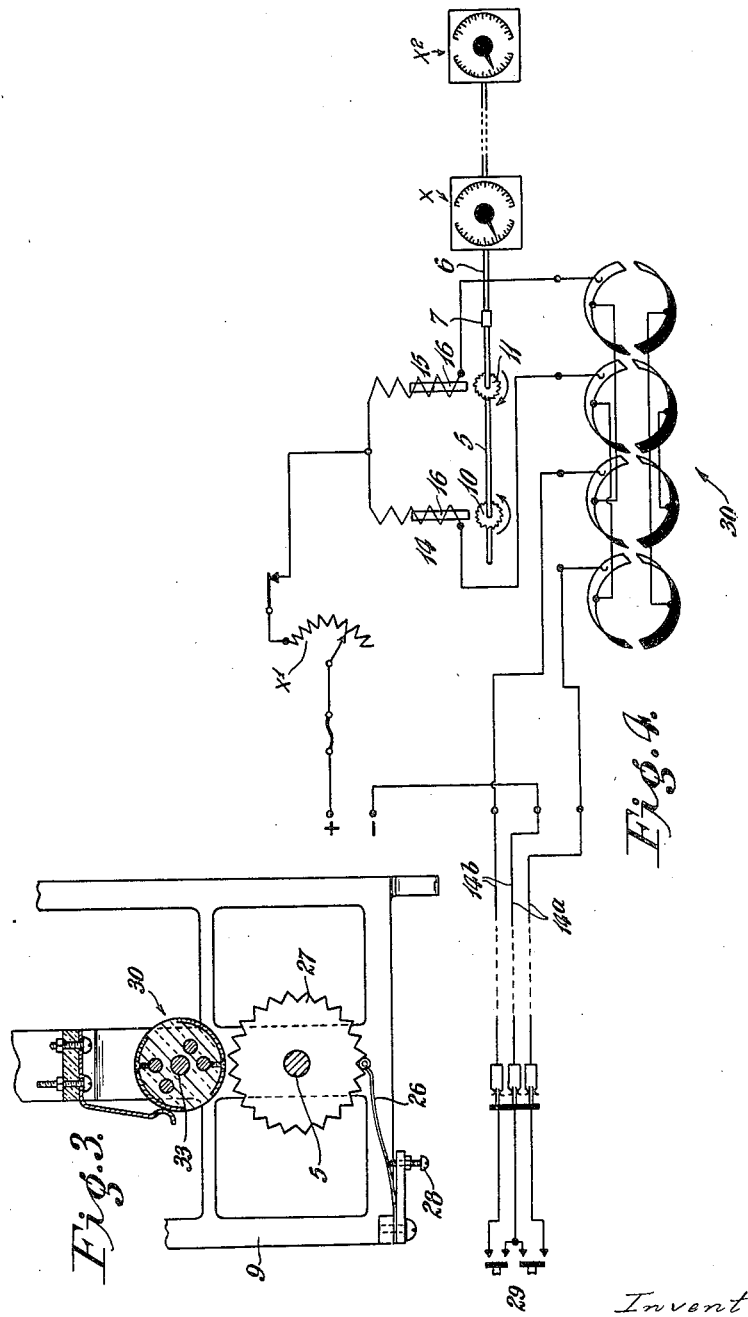

INVENTOR
JAMES L. THORNLEY
By Emil Bönnelycke
ATTORNEY

Patented Aug. 14, 1934

1,970,064

UNITED STATES PATENT OFFICE 1,970,064

REMOTE VOLUME CONTROL FOR TALKING AND/OR SOUND PICTURE EQUIPMENT

James Leiver Thornley, Melbourne, Victoria, Australia

Application November 25, 1930, Serial No. 498,196
In Australia January 31, 1930

3 Claims. (Cl. 179—100.1)

In the reproduction of sound synchronously with motion pictures it has been found necessary to provide for control of the sound volume which regulation is effected from the operator's box. The system adopted in various theatres is to employ an assistant located in the audience and known as a monitor, who, by signalling means indicates to the operator in the box the necessity for the adjustment of the sound volume which varies very considerably according to the existing acoustic properties of the theatre which vary from time to time according to the numerical magnitude of the audience, the weather conditions and other factors. This method is not, however, entirely satisfactory, nor can it be expected to be under all conditions principally by reason of the fact that a period of time must elapse between the despatch and receipt of the signal to the operator and the adjustment operation necessary to be performed by the latter.

These difficulties are more pronounced when the reproduction of a sound picture is being performed for the first time when neither the operator or monitor may be acquainted with the varying volumes of sound which will be produced under uncontrolled conditions.

The present invention is directed towards reducing the disabilities at present arising as above indicated and essentially consists in the provision of means located within the operator's box adapted to be independently controlled by a monitor in the auditorium and also to effect adjustment of a sound modulating device or devices such as a variable resistance in the sound reproduction circuit of the sound picture equipment whereby the sound volume is varied according to the will of the monitor.

Various means for the purpose stated may be employed according to conditions existing with any particular equipment and in the practical form of such means hereinafter described, the adjustment mentioned is effected by electromechanical apparatus.

The electro-mechanical apparatus beforementioned essentially comprises switching means controlled by the monitor and controlling the circuits of a pair of electromagnets operating through pawl and ratchet mechanism to impart motion in opposite directions to a spindle coupled to the said modulating device or devices, only one of said magnets operating at a time to impart motion in a direction opposite to that of the other magnet when the latter is in operation.

Reference will now be made to the accompanying drawings illustrating a practical electro-mechanical apparatus having the essential features abovementioned.

In these drawings, Fig. 1 is a front elevation of the apparatus.

Fig. 2 is a central vertical cross setion on line II—II in Fig. 1.

Fig. 3 is a sectional elevation on line III—III in Fig. 1.

Fig. 4 is a circuit diagram showing the electrical control and actuation of the apparatus.

Figure 5:
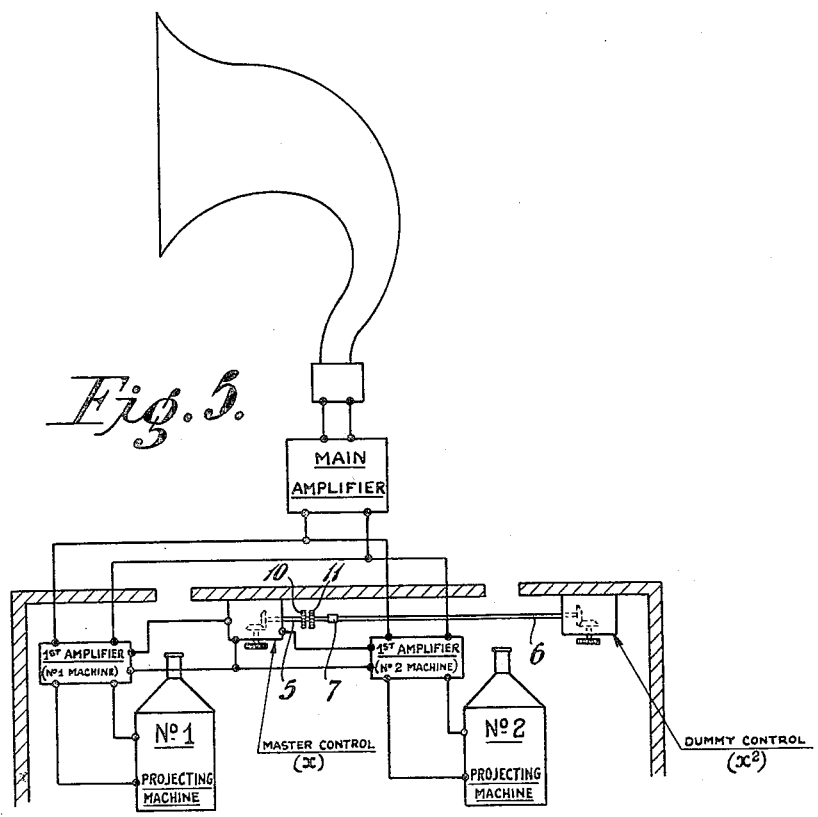
Fig. 5 is a diagrammatic representation of dual projecting machines and associated speaker.

The spindle 5 to be rotated in opposite directions as hereinafter described is suitably coupled to the spindle 6 of the sounding modulating device or devices as for example by the rubber tube 7 which while providing a resilient mechanical coupling will also function to prevent any leakage of electric current from one spindle to the other.

The spindle 5 is mounted in suitable bearings 8 in the frame 9 and between said bearings are fixedly mounted on the spindle 5 a pair of oppositely toothed ratchet wheels 10 and 11 to be engaged by pawls 12 and 13 respectively. The pawls 12 and 13 are located on opposite sides of the spindle 5, the pawl 12 being actuated by electromagnet 14 and the other pawl by electromagnet 15 so that one operates to rotate the spindle in the opposite direction to that effected by the other pawl.

The construction and operation of each pawl by its respective magnet is identical and the magnets are of the solenoid type and mounted side by side in the frame 9 (see Fig. 2).

The core 16 of each magnet is dependently attached to a rod 17, the upper end of which is loaded as by means of a metal disc 18.

Each core has a link 19 pivotally dependent therefrom and connected by pin and slot connection to a radial arm 20 pivotally attached to the spindle 5 and carrying between the latter and said connection one of the pawls 12 and 13. Each of these pawls is pivoted to its respective arm 20 and is slightly spring urged over its pivotal centre by leaf spring 21 towards its co-acting ratchet wheel 10 or 11, its position relative to the latter being adjustable by set screw 22 (see Fig. 2). The pawl is overbalanced towards its co-acting ratchet wheel when the arm 20 is raised by energization of its controlling magnet, by means of the finger piece 23 and the spring 21 before described. The overbalancing movement of the pawl serves to bring it into engagement with its co-acting ratchet wheel 10 or 11.

The usual central aperture containing the core 16 of each of the magnets 14 and 15 has a guide member 24 fitted in the upper end (see Fig. 2) for the rod 17, and to deaden the noise of the core when it reaches the end of its stroke in either direction a rubber annular disc 25 is fitted near each end of said rod 17.

To prevent any overrun of the shaft 5 a spring leaf brake 26 (see Fig. 3) contacts with a toothed wheel 27 mounted on said spindle. The tension of said brake 26 is adjustable by a set screw 28 fitted into an extension on the frame 9 (see Fig. 1).

Each of the magnets 14 and 15 has a separate circuit 14a and 14b (see Fig. 4) separately controlled by switching means at 29, each circuit controlling the operation of the sound modulation device indicated at X to increase or decrease the sound volume as considered desirable by the monitor.

To control the operation of the magnets 14 and 15 under varying voltage conditions, an adjustable resistance XI may be inserted in the current supply.

The modulation device X indicated in Fig. 4 is of the dual type for use with dual machines, and to meet the condition arising when change over occurs from one to the other machine, a change over switch 30 is provided in the apparatus, the contacts and segment strips in which are clearly disclosed by Figs. 1, 3 and 4. The throwing of the change over switch is effected in the operator's box at the time of changing over the machines when he places the indicator finger on X on the opposite half of the calibrated scale shown to that with which the pointer previously registered.

The change over switch is actuated when the operator effects the change stated in the position of the indicator finger on X, through spindle 5 and gear wheels 31 and 32, the latter being mounted on the spindle 33 of the rotary change over switch 30.

It will usually be found convenient to provide an equivalent dial and finger on a dummy modulation device X2 which is operated in unison with the modulation device, X being mechanically coupled to the latter by suitable means.

It will be appreciated that following the change over mentioned, the circuit 14a will then control the magnet 15 while the circuit 14b will also control magnet 14, and consequently a simple 2-button switch at 29 will suffice at all times, the same button being always depressed to effect increased sound volume, and the other for decreased volume. This meets the arrangement at X in which the two resistances, one for each machine, are each adjusted for increase of volume by an upward movement of the pointer.

In the case of a single machine, the change over switch 30 and its associated parts will not be required, in which case the circuits 14a and 14b will be maintained constantly connected to the respective magnets 14 and 15.

In Fig. 5 of the drawings there is shown diagrammatically the connections between two projecting machines and a single speaker. As shown in this figure, the master control device X is mechanically coupled to the dummy control device X2 by means of shaft 5 hereinbefore described.

It will be realized from the showing in this figure that the dummy control X2 is provided for use by an operator attending No. 2 projecting machine. If the operator stands on the right side of No. 2 projecting machine, he may easily effect the necessary control of the speaker without passing around the machine to a position where he would have direct access to the master control X.

Figure 6:
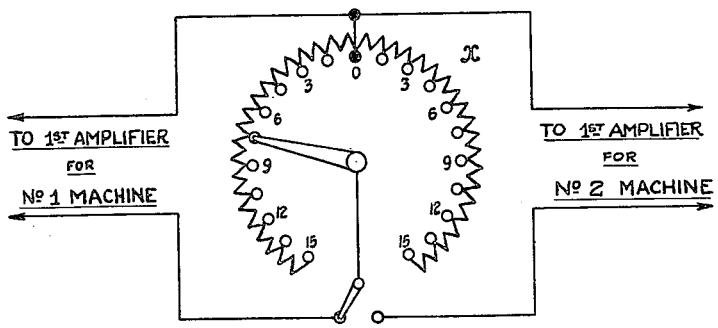
Fig. 6 is a diagram illustrating the circuit between the amplifiers and the control mechanism.

In Fig. 6 of the drawings, there is shown a resistance divided into two halves, each half having a number of taps provided with contact points indicated by numerals 0 to 15. One half of the resistance is adapted to control No. 1 machine, while the other half controls No. 2 machine.

The switch shown at the bottom of Fig. 6 is shifted when the operation of one machine is stopped and the other one is started. By shifting this switch so as to bring the desired half of the resistance into use, proper control of the desired machine may be effected.

It will be appreciated from Fig. 6 that the control of the volume from No. 1 machine necessitates operation of the switching arm in anticlockwise direction and in the reverse direction for No. 2 machine. Obviously, since the monitor in the auditorium is unaware of the time the change-over takes place, it is necessary to provide the automatic change-over switch 30 shown in Fig. 4 of the drawings.

It may here be remarked that the control switch arm of Fig. 6 which is under the control of the operator in the box would, when a change-over is taking place, be placed on the opposite half of the resistance. In the absence of the changing-over switch 30 and a knowledge on the part of the monitor as to when the change-over occurs, any operation by him might result in exactly the reverse result to which he desired, until the volume of sound indicated that it would be necessary for him to reverse his operations. It is, of course, quite clear that it is always an advantage to an operator to have to operate a manual control device in the same direction at all times to secure the same results.

By reason of applicant's structure, a decided advantage is obtained in that the operator and the monitor in the auditorium have independent control at all times and one is a check on the other.

I claim,

1. An apparatus for adjusting the position of a movable element of a dual variable translating device associated with a dual moving picture projection machine for varying the output of a loud speaker operating simultaneously with the projection machine, comprising a spindle coupled to the movable element, a pair of discs fixed on said spindle, each disc having one-way ratchet teeth on the periphery thereof, the teeth on one disc being arranged oppositely from the teeth on the other disc, an electromagnetically operated pawl associated with one disc and adapted to cause the disc to rotate in one direction upon passing a current through its operating electromagnet, a second electromagnetically operated pawl associated with the other disc and adapted to rotate this disc in the opposite direction upon passing a current through its operating electromagnet, a rotary switch having two sets of contacts and having the rotary element mounted on a shaft, one set of contacts being adapted to place one portion of the dual translating device in the loud speaker circuit and the other set of contacts being adapted to place the other portion of the dual translating device in the loud speaker circuit, and means for coupling the shaft to the spindle so that when the spindle is shifted to actuate one portion of the translating device the rotary switch is moved to complete the corresponding circuit.

2. An apparatus for adjusting the position of a movable element of a dual variable translating device associated with a dual moving picture projection machine for varying the output of a loud speaker operating simultaneously with the projection machine, comprising a spindle coupled to the movable element, electromagnetic means for rotating the spindle step by step in either direction, a rotary switch having two sets of contacts and having the rotary element mounted on a shaft, one set of contacts being adapted to place one portion of the dual translating device in the loud speaker circuit and the other set of contacts being adapted to place the other portion of the dual translating device in the loud speaker circuit, and means for coupling the shaft to the spindle so that when the spindle is shifted to actuate one portion of the translating device the rotary switch is moved to complete the corresponding circuit.

3. In sound-picture dual machine equipment, in combination a divided resistance controlling the individual sound amplifier circuits of each machine, with means for adjusting the position of a control arm common to the divisions of said resistance, comprising electromagnetic means for rotating the spindle of said control arm in either direction, switching means located at a remote point controlling said electromagnetic means, and change-over switching means in said resistance controlled amplifier circuits for electrically connecting said remote switching means to the division of the resistance controlling the amplifier circuit of the machine in operation.

JAMES LEIVER THORNLEY.